United States Patent
Yang et al.

(10) Patent No.: US 9,559,625 B2
(45) Date of Patent: Jan. 31, 2017

(54) SOLID-STATE RELAY FOR RUNNING DIRECTION CONTROL OF THREE-PHASE ALTERNATING CURRENT MOTOR AND METHOD THEREOF

(71) Applicant: KUDOM ELECTRONICS TECHNOLOGY (SHANGHAI) CO., LTD., Shanghai (CN)

(72) Inventors: Jiantao Yang, Shanghai (CN); Zhiming Zeng, Shanghai (CN); Fangzeng Chen, Shanghai (CN)

(73) Assignee: KUDOM ELECTRONICS TECHNOLOGY (SHANGHAI) CO., LTD., Shanghai (CN)

( * ) Notice: Subject to any disclaimer, the term of this patent is extended or adjusted under 35 U.S.C. 154(b) by 156 days.

(21) Appl. No.: 14/396,675

(22) PCT Filed: Jan. 25, 2013

(86) PCT No.: PCT/CN2013/000075
§ 371 (c)(1),
(2) Date: Oct. 23, 2014

(87) PCT Pub. No.: WO2013/159557
PCT Pub. Date: Oct. 31, 2013

(65) Prior Publication Data
US 2015/0130393 A1    May 14, 2015

(30) Foreign Application Priority Data

Apr. 23, 2012   (CN) .......................... 2012 1 0119079

(51) Int. Cl.
*H02P 23/00*    (2016.01)
*H02P 23/24*    (2016.01)
(Continued)

(52) U.S. Cl.
CPC ........ *H02P 23/0072* (2013.01); *H02H 7/0838* (2013.01); *H02H 7/09* (2013.01);
(Continued)

(58) Field of Classification Search
USPC .......................................................... 318/806
See application file for complete search history.

(56) References Cited

U.S. PATENT DOCUMENTS 3,825,768 A * 7/1974 Grygera ............... G01R 19/145
307/127
5,184,063 A * 2/1993 Eisenhauer .......... G01R 25/005
324/108
(Continued)

FOREIGN PATENT DOCUMENTS

CN          1181650 A        5/1998
CN          1627627 A        6/2005
(Continued)

*Primary Examiner* — Eduardo Colon Santana
*Assistant Examiner* — Devon Joseph
(74) *Attorney, Agent, or Firm* — Muncy, Geissler, Olds & Lowe, P.C.

(57) ABSTRACT

A solid state relay for controlling a three-phase AC motor running direction is provided, a driver module, power components module, phase sequence detection module, phase lack detection module, and automatic phase correction and phase lack protection logic module. The input of the phase sequence detection module is connected to the three-phase power supply, and the output is connected to the automatic phase correction and phase lack protection logic module, to provide phase sequence detection and a phase sequence signal to the automatic phase correction and phase lack protection logic module. The input of the phase lack detection module is connected to the three-phase power supply, and the output is connected to the automatic phase correction and phase lack protection logic module, to detect a lack (Continued)

of phase and provide the lacking phase signal to the automatic phase correction and phase lack protection logic module.

10 Claims, 9 Drawing Sheets

(51) Int. Cl.
 *H02H 7/09* (2006.01)
 *H02H 7/08* (2006.01)
 *H02H 7/122* (2006.01)
(52) U.S. Cl.
 CPC ........ *H02H 7/1222* (2013.01); *H02H 7/1225* (2013.01); *H02P 23/24* (2016.02)

(56) References Cited

U.S. PATENT DOCUMENTS

| | | | | |
|---|---|---|---|---|
| 2004/0032285 A1* | 2/2004 | Minzoni | ............... | H03D 13/003 327/2 |
| 2005/0270072 A1* | 12/2005 | Chang | ............... | H03D 13/004 327/40 |
| 2008/0191746 A1* | 8/2008 | Friedman | ............. | H03D 13/004 327/5 |
| 2009/0096401 A1* | 4/2009 | Watabe | ..................... | B25F 5/00 318/446 |
| 2009/0128972 A1* | 5/2009 | Wu | ..................... | G01R 19/2513 361/77 |
| 2009/0243550 A1* | 10/2009 | Arai | ....................... | H02J 7/1492 320/157 |
| 2009/0302906 A1* | 12/2009 | Rhee | ................. | G01R 31/31709 327/156 |
| 2011/0043148 A1* | 2/2011 | Lin | ........................... | H02P 6/15 318/400.13 |
| 2012/0039378 A1* | 2/2012 | Nakayama | ............ | H02M 3/337 375/226 |
| 2012/0229134 A1* | 9/2012 | Abe | ..................... | G01R 15/202 324/253 |
| 2012/0261983 A1* | 10/2012 | Kaneda | ..................... | H02P 9/10 307/9.1 |

FOREIGN PATENT DOCUMENTS

| | | |
|---|---|---|
| CN | 1866659 A | 11/2006 |
| CN | 201025671 Y | 2/2008 |
| CN | 201533276 U | 7/2010 |
| CN | 102025814 A | 4/2011 |
| CN | 202134896 U | 2/2012 |
| CN | 102664568 A | 9/2012 |
| CN | 202565213 U | 11/2012 |
| JP | H09130964 A | 5/1997 |
| SU | 1350736 A1 | 11/1987 |

* cited by examiner

S1:Three-phase power supply is connected to the phase sequence detection module122, which can detect the three-phase power supply phase sequence, and then provide the phase sequence signal to signal processing unit132 of the automatic phase correction and phase-lack protection logic module13.

S2: Three-phase power supply is connected to the phase-lack detection module121, which can detect the three-phase power supply whether there is a lack of phase, and then provide the phase-lack signal to signal processing unit of the automatic phase correction and phase-lack protection logic module13.

S3: The control signal CS input signal conversion unit131, signal conversion unit131 processing the control signal CS and then output it to the signal processing unit132.

S4: Signal processing unit132 processing the transmission signal of signal conversion unit131 and the input signal of phase sequence detection module122 and phase-lack detection module121, and then output the processed control result to the driver module14.

S5: Driver module14 through the control power component module15 to control the phase sequence of the three-phase motor.

Figure 10

SOLID-STATE RELAY FOR RUNNING DIRECTION CONTROL OF THREE-PHASE ALTERNATING CURRENT MOTOR AND METHOD THEREOF

BACKGROUND OF THE INVENTION

Field of the Invention

The present invention relates to a solid state relay, in particular, to a solid state relay and control method for three-phase AC motor running direction.

Brief Description of the Related Art

A three-phase solid state relay in a three-phase motor is used as switches. In general, two groups of power components in the three-phase solid state relay are used for the three-phase power supply and three-phase AC motor reversing switching.

During use, problems of the three-phase AC motor power supply can cause serious consequences.

For example, the phase sequence of the three-phase AC motor changes due to wiring and repairing, which will make the motor work reverse and influence normal operation, will also sometimes damage the external mechanical parts of the motor.

In another example, the three-phase power supply can have phase lack due to wiring, repairing, and vibration, which will make the motor current leap due to phase lack. If the motor works long-term in a state of phase lack, it will make the motor burn down and the solid state relay will be damaged by the high current.

FIG. 1 shows the main structural diagram for existing technology in the solid state relay (SSR) 50, using discrete components. The three-phase solid state relay (SSR) 50 includes a driver module 51 and a power components module 52 which is connected to the driver module 51. Among them, the input terminal I1 and I2 of the driver module 51 are connected to the control signal CS. The control signal CS inputs DC control signal in input terminal I1 or I2. The input terminal L1,L2,L3 of the power components module 52 are connected to the three-phase power supply, the output terminals U,V,W are connected to the load LOAD. LOAD is mainly composed of a motor. The working principle is that, when the I1 is valid, the output terminal U is connected to input terminal L1, the output terminal V is connected to input terminal L2, and the output terminal W is connected to input terminal L3. When the I2 is valid, the output terminal U is connected to input terminal L1, the output terminal V is connected to input terminal L3, and the output terminal W is connected to input terminal L2. This can be controlled via the I1 and I2 to change the phase sequence of the three-phase power supply added at the load end, thereby controlling the motor running direction.

The thyristor is usually used as the power component in power components module 52, while the driver module 51 is usually composed of triode, resistance, capacitance, and photoelectric couplers. The constant current circuit, which is composed of triode, resistance, and capacitance, receives the control signal of input terminal I1 or I2, so that the light emitting diode in the photoelectric coupler could luminescence and make the output of the photoelectric coupler enter a conducting state and trigger the corresponding thyristor conduction.

Because the thyristor turn-off characteristics are relatively special, the load current must be less than a certain degree to completely shut off the thyristor. Therefore, in switching the two groups of power components in the solid state relay itself for a short time, one group of power components are not completely cut-off while another group of power components are conducted, leading to internal interphase short circuit of the three-phase solid state relay, which can then damage the equipment.

At present, in using the external equipment (such as phase sequence protector and controller MCU) to detect the three-phase power supply phase sequence and phase lacking state, according to the power supply state, the external equipment provides the control signal to the solid state relay, and then controls the power components' turn-on and turn-off time to solve the above problems.

Although the use of external equipment could solve some problems in the use of solid state relay for three-phase AC motor, the volume of the external equipment itself is larger, the system is more complex (For example, in order to process the signal logical relations, the central processor will be required), the price is higher, and there are also compatibility problems and obvious shortcomings. So, we must have a kind of structure function which is centralized, safe, reliable, and low-cost in the three-phase solid state relay to solve the above problems.

BRIEF SUMMARY OF THE INVENTION

In order to overcome the defects of the existing technology, the present invention discloses a solid state relay and control method for three-phase AC motor running direction, the structure function being centralized, safe, reliable, and low-cost.

The technical proposal of the invention is as follows:

A new solid state relay for the control of three-phase AC motor running direction includes the driver module, power components module, phase sequence detection module, phase lack detection module, automatic phase correction and phase lack protection logic module. The driver module is connected to the power components module, and the power components module is connected to the three-phase power supply and three-phase load.

The input terminal of the phase sequence detection module is connected to the three-phase power supply, the output terminal is connected to the automatic phase correction and phase lack protection logic module, which is used for detecting phase sequence of the three-phase power supply and providing phase sequence signal to the automatic phase correction and phase lack protection logic module.

The input terminal of the phase lack detection module is connected to the three-phase power supply, the output terminal is connected to the automatic phase correction and phase lack protection logic module, which is used for detecting the three-phase power supply in the presence of phase lacking and providing the missing phase signal to the automatic phase correction and phase lack protection logic module.

The automatic phase correction and phase lack protection logic module further includes:

Signal conversion unit, which is used for receive the control signal and make it level conversion.

Signal processing unit, which is connected to the signal conversion unit, and then connected to the phase sequence detection module output terminal and phase lack detection module output terminal and the driver module respectively. This is used for processing the control signal and then outputting the processed control results to the driver module.

Preferably, the signal processing unit further includes a phase lack protection sub-unit, automatic phase correction sub-unit, interlock sub-unit, delay sub-unit, the first input terminal, the second input terminal, the third input terminal, the fourth input terminal, the first output terminal, and the second output terminal.

The first input terminal and the second input terminal are connected to the signal conversion unit output terminal respectively.

The third input terminal is connected to the phase lack detection module output terminal.

The fourth input terminal is connected to the phase sequence detection module output terminal.

The first output terminal and the second output terminal are connected to the signal processing unit output terminal respectively.

Among them, the first input terminal to the third input terminal is connected to the phase lack protection sub-unit respectively, the fourth input terminal is connected to the automatic phase correction sub-unit, the first output terminal and the second output terminal are connected to the delay sub-unit.

The phase lack protection sub-unit, automatic phase correction sub-unit, interlock sub-unit, delay sub-unit are in turn connected, or the automatic phase correction sub-unit, phase protection sub-unit, interlock sub-unit, delay sub-unit are in turn connected.

Among them:

The phase lack protection sub-unit is used according to the phase detection module output phase signal. The output is locked directly and the results are invalid when the three-phase electricity has a lack of phase.

The automatic phase correction sub-unit is used according to the phase sequence detection module output phase sequence signal. The output is instead with the input control signal through the automatic phase correction sub-unit when the three-phase electricity phase sequence is changed.

The interlock sub-unit is used for a unit for the current output to the interlock sub-unit identical signals, when the output is locked and the result is invalid.

The delay sub-unit will delay the output control signal of the driver module and make the control signal output to the driver module after the power components of the power components module shut off.

Preferably, the phase lack protection sub-unit further includes:

The first resistance, the second resistance, the first diode, and the second diode.

The first resistance is connected to the anode of the first diode, the anode of the first diode is connected to the first input terminal. The anode of the first diode as the first output terminal of the phase lack protection sub-unit.

The second resistance is connected to the anode of the second diode, the anode of the second diode is connected to the second input terminal. The anode of the second diode as the second output terminal of the phase lack protection sub-unit.

The cathode of the first diode is connected to the cathode of the second diode, and then connected to the third input terminal.

Preferably, the automatic phase correction sub-unit further includes the first XOR (exclusive-OR) logic device and the second XOR (exclusive-OR) logic device.

An arbitrary input terminal of the first XOR (exclusive-OR) logic device is connected to an arbitrary input terminal of the second XOR (exclusive-OR) logic device, and the input terminal of the first XOR (exclusive-OR) logic device is connected to the fourth input terminal.

The other input terminal of the first XOR (exclusive-OR) logic device is connected to the first output terminal of the phase lack protection sub-unit.

The other input terminal of the second XOR (exclusive-OR) logic device is connected to the second output terminal of the phase lack protection sub-unit.

Preferably, the interlock sub-unit further includes the third resistance, the first capacitance, the third XOR (exclusive-OR) logic device, the fourth XOR (exclusive-OR) logic device, the first AND logic device, and the second AND logic device.

One terminal of the third resistance is connected to the working power supply, the other terminal is connected to an arbitrary input terminal of the third XOR (exclusive-OR) logic device, an arbitrary input terminal of the fourth XOR (exclusive-OR) logic device, and an arbitrary terminal of the first capacitance, respectively.

The other terminal of the first capacitance is connected to the working ground.

The other input terminal of the third XOR (exclusive-OR) logic device is connected to the output terminal of the first XOR (exclusive-OR) logic device and an arbitrary input terminal of the second AND logic device respectively.

The output terminal of the third OXR (exclusive-OR) logic device is connected to an arbitrary input terminal of the first AND logic device.

The other input terminal of the fourth OXR (exclusive-OR) logic device is connected to the output terminal of the second XOR (exclusive-OR) logic device and the other input terminal of the first AND logic device, respectively.

The output terminal of the fourth OXR (exclusive-OR) logic device is connected to the other input terminal of the second AND logic device.

Preferably, the delay sub-unit further includes:

The fourth resistance, the fifth resistance, the sixth resistance, the seventh resistance, the eighth resistance, the second capacitance, the third capacitance, the third diode, the fourth diode, the third AND logic device, and the fourth AND logic device.

The third diode and the fourth resistance are in parallel, the cathode of the third diode is connected to the output terminal of the first AND logic device, the anode of the third diode is connected to an arbitrary terminal of the eighth resistance and an arbitrary input terminal of the third AND logic device, respectively.

The fourth diode and the fifth resistance are in parallel, the cathode of the fourth diode is connected to the output terminal of the second AND logic device, the anode of the fourth diode is connected to an arbitrary terminal of the seventh resistance and an arbitrary input terminal of the fourth AND logic device, respectively.

The other terminal of the seventh resistance is connected to the anode of the second capacitance, and the cathode of the second capacitance is connected to the working ground.

The other terminal of the eighth resistance is connected to the anode of the third capacitance, and the cathode of the third capacitance is connected to the working ground.

An arbitrary terminal of the sixth resistance is connected to the other input terminal of the third AND logic device and the other input terminal of the fourth AND logic device, respectively, and the other terminal of the sixth resistance is connected to the working power supply.

The output terminal of the third AND logic device is connected to the first output terminal.

The output terminal of the fourth AND logic device is connected to the second output terminal.

Preferably, the phase sequence detection module further includes:

The fourteenth resistance, the fifteenth resistance, the sixteenth resistance, the seventeenth resistance, the eighteenth resistance, the nineteenth resistance, the twentieth resistance, the fifth capacitance, the sixth capacitance, the seventh capacitance, the eighth capacitance, the eleventh diode, the twelfth diode, the thirteenth diode, the fourteenth diode, and the first photoelectric coupler.

The first phase of the three-phase power supply is connected to an arbitrary terminal of the fifteenth resistance and an arbitrary terminal of the sixth capacitance, respectively.

The other terminal of the fifteenth resistance is connected to an arbitrary terminal of the fourteenth resistance, an arbitrary terminal of the eighteenth resistance, the anode of the eleventh diode, and the cathode of the twelfth diode, respectively.

The other terminal of the sixth capacitance is connected to an arbitrary terminal of the sixteenth resistance.

The other terminal of the sixteenth resistance is connected to the other terminal of the eighteenth resistance, an arbitrary terminal of the seventeenth resistance, the anode of the thirteenth diode, and the cathode of the fourteenth diode, respectively.

The second phase of the three-phase power supply is connected to an arbitrary terminal of the fifth capacitance.

The other terminal of the fifth capacitance is connected to the other terminal of the fourteenth resistance.

The third phase of the three-phase power supply is connected to the other terminal of the seventeenth resistance.

The input terminal of the first photoelectric coupler and the anode of the light-emitting diode (LED) are connected to the cathode of the eleventh diode, the cathode of the thirteenth diode and an arbitrary terminal of the seventh capacitance, respectively, and the cathode of LED is connected to an arbitrary terminal of the nineteenth resistance.

The other terminal of the nineteenth resistance is connected to the other terminal of the seventh capacitance, the anode of the twelfth diode, and the cathode of the fourteenth diode, respectively.

The output terminal of the first photoelectric coupler and the collector of the triode are connected to the working power supply, the emitter of the triode is connected to an arbitrary terminal of the twelfth resistance, an arbitrary terminal of the eighth capacitance and the fourth input terminal, respectively.

The other terminal of the twelfth resistance and the other terminal of the eighth capacitance are connected to the working ground, respectively.

Preferably, the phase lack detection module further includes:

The ninth resistance, the tenth resistance, the eleventh resistance, the twelfth resistance, the thirteenth resistance, the fourth capacitance, the fifth diode, the sixth diode, the seventh diode, the eighth diode, the ninth diode, the tenth diode, the second photoelectric coupler, the first triode, and the second triode.

The first phase of the three-phase power supply is connected to an arbitrary terminal of the ninth resistance, and the other terminal of the ninth resistance is connected to the anode of the fifth diode and the cathode of the eighth diode, respectively.

The second phase of the three-phase power supply is connected to an arbitrary terminal of the tenth resistance, and the other terminal of the tenth resistance is connected to the anode of the sixth diode and the cathode of the ninth diode, respectively.

The third phase of the three-phase power supply is connected to an arbitrary terminal of the eleventh resistance, and the other terminal of the eleventh resistance is connected to the anode of the seventh diode and the cathode of the tenth diode, respectively.

The input terminal of the second photoelectric coupler and the anode of LED are connected to the cathode of the fifth diode, the cathode of the sixth diode and the cathode of the seventh diode, respectively, and the cathode of the LED is connected to the anode of the eighth diode, the anode of the ninth diode, and the anode of the tenth anode, respectively.

The output terminal of the second photoelectric coupler and the collector of the triode are connected to the working power supply, and the emitter of the triode is connected to an arbitrary terminal of the twelfth resistance and the base electrode of the first triode.

The other terminal of the twelfth resistance is connected to the working ground.

The collector of the first triode is connected to the working power supply, and the emitter is connected to an arbitrary terminal of the fourth capacitance and an arbitrary terminal of the thirteenth resistance.

The other terminal of the fourth capacitance is connected to the working ground.

The base electrode of the second triode is connected to the other terminal of the thirteenth resistance, the collector is connected to the third input terminal, and the emitter is connected to the working ground.

The solid state relay and control method for three-phase AC motor running direction includes the following steps:

S1: The three-phase power supply is connected to the phase sequence detection module, which can detect the power phase sequence of three-phase power supply, and then provides the phase sequence signal to signal processing units of the automatic phase correction and phase lack protection logic module.

S2: The three-phase power supply is connected to the phase lack detection module, which can detect whether there is a lack of phase in the three-phase power supply, and then provides the phase lack signal to signal processing units of the automatic phase correction and phase lack protection logic module.

S3: The control signal CS is input to the signal conversion unit which processes the control signal CS and then outputs it to the signal processing unit.

S4: The signal processing unit processes the transmission signal of the signal conversion unit and the input signal of the phase sequence detection module and phase lack detection module, and then outputs the processed control result to the driver module.

S5: The drive module controls the phase sequence of the three-phase motor by controlling the power components module.

Preferably, S4 further includes:

S41: The control signal after the level conversion of the signal conversion unit and the lacking phase signal of the phase lack detection module are output to the phase lack protection sub-unit, when the three-phase power supply has phase lacking, the phase lack protection sub-unit will lock the output result, that is making the control signal output invalid, according to the phase lack signal of the phase lack detection module.

S42: The output signal of the phase lack protection sub-unit and the phase sequence signal of the phase sequence detection module are output to the automatic phase correction sub-unit, when the phase sequence of the three-phase power changes, the automatic phase correction sub-unit makes the control signal output reverse and the phase sequence of three-phase power supply with load unchanged according to the phase sequence signal of the phase sequence detection unit.

S43: The output signal of the automatic phase correction sub-unit is input to the interlock sub-unit, when the automatic phase correction sub-unit is output to the interlock sub-unit signals are identical, the interlock sub-unit will lock the output result and make the control signal output invalid.

S44: The output signal of the interlock sub-unit is transmitted to the delay sub-unit, the delay sub-unit will delay the output control signal of the driver module and make the control signal output to driver module after the power components of the power components module shut off.

Compared with the existing technology, the beneficial effect of the present invention is as follows:

First, the solid state relay of the invention with the structure function concentration can realize automatic phase correction and phase lack protection without external equipments.

Second, the solid state relay realizes the automatic phase correction and phase lack protection structure completely by discrete components, namely the hardware. This eliminates the MCU/DSP controller that may be used for external equipments and saves cost, with low price achieving the same function.

Third, two control signals of the positive rotation and reverse rotation in the solid state relay interlocking and delay a period of time and then provide it to the control logic, which solves the problem of thyristor turn-off characteristic caused by the phase to phase short circuit fault.

Fourth, solid state relay works in strong electricity conditions, requiring the working device to have strong anti-interference ability. The structure of the solid state relay is composed of discrete components, namely the hardware circuit implementation, so it has strong anti-interference ability.

Fifth, the structure of the solid state relay is composed of discrete components, namely the hardware circuit implementation. This is better when compared with the MCU/DSP implementation circuit. Crash phenomenon and software operation error caused by damage to the device or accident do not exist. Also, the realization of the invention has the advantages of simple circuit and reliable safety.

Sixth, the invention allows the three-phase AC motor in the three-phase power to be monitored in real-time so that, when the lack of phase occurs, the input signal path is cut-off, the power module is shut off, and motor burnout due to open-phase operation can be avoided.

Seventh, the invention can provide real-time monitoring of the input three-phase power phase sequence so that, when the phase sequence of the input three-phase power changes, the internal control logic will be issued corresponding control instructions and make the motor phase constant. This avoids the motor running direction and the expected direction to be in non-conformance due to the phase sequence changes.

BRIEF DESCRIPTION OF THE DRAWINGS

FIG. 10 shows a flow chart for the control method of three-phase AC motor running direction.

DETAILED DESCRIPTION OF THE PREFERRED EMBODIMENTS

The present invention will become more fully understood from the detailed description given hereinbelow and the accompanying drawings which are given by way of illustration only, and thus are not limitative of the present invention.

Figure 1:
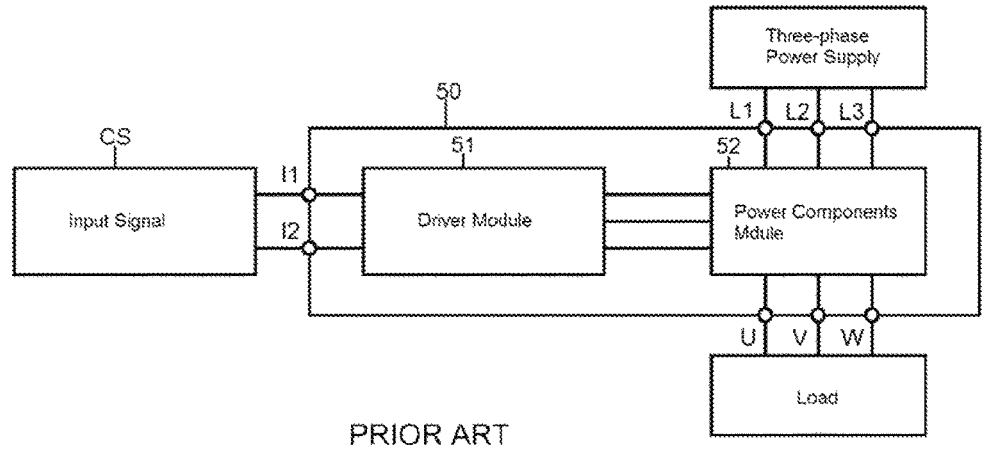
FIG. 1 shows a structure diagram for the solid state relay of existing technology.
Figure 2:
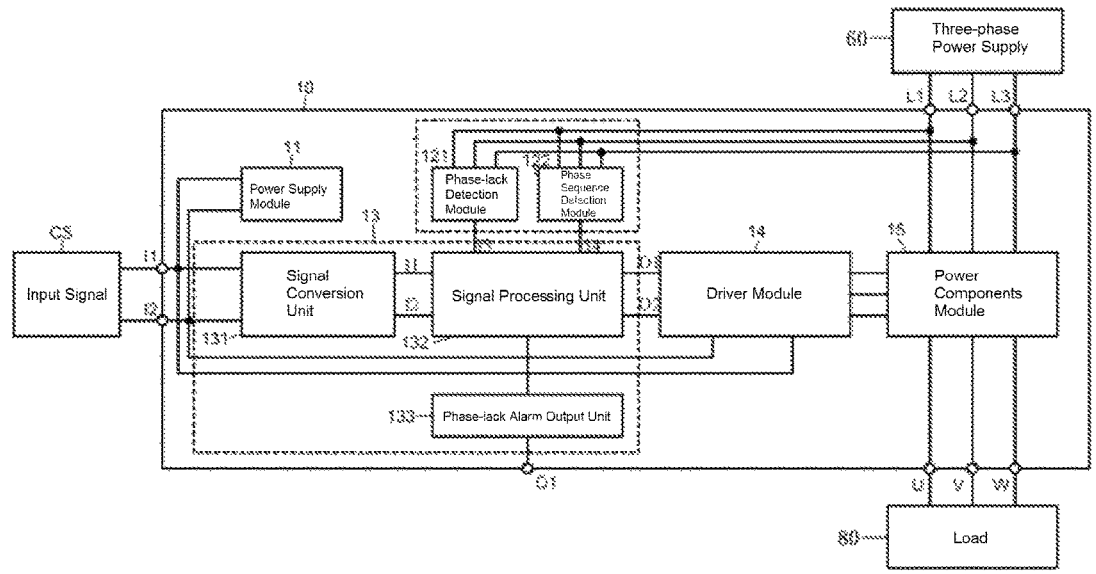
FIG. 2 shows a structure diagram for the solid state relay for the control of three-phase AC motor running direction.

As shown in FIG. 2, a novel solid state relay 10 for the control of three-phase AC motor running direction is provided, including driver module 14, power components module 15, phase sequence detection module 122, phase lack detection module 121, automatic phase correction and phase lack protection logic module 13, and power supply module 11.

The driver module 14 is connected to the power components module 15, and power components module 15 is connected to the three-phase power supply 60 and three-phase load 80, respectively.

Power supply module 11 will provide 5V power supply to the phase sequence detection module 122, phase lack detection module 121 and automatic phase correction and phase lack protection logic module 13 through the control signal CS. The figure does not show the power supply connection relations between power supply module 11 and phase sequence detection module 122, phase lack detection module 121, and automatic phase correction and phase lack protection logic module 13.

Among them, the input terminal of the phase sequence detection module 122 is connected to the three-phase power supply 60, and output terminal I4 is connected to the automatic phase correction and phase lack protection logic module 13, which is used for phase sequence detection of the three-phase power supply 60, and provides phase sequence signal to automatic phase correction and phase lack protection logic module 13.

The input terminal of the phase lack detection module 121 is connected to the three-phase power supply 60, and output terminal I3 is connected to the automatic phase correction and phase lack protection logic module 13, which is used for three-phase power supply in the presence of a lack of phase and provides the lacking phase signal to automatic phase correction and phase lack protection logic module 13.

Among them, the automatic phase correction and phase lack protection logic module 13 further includes:

The input terminal of the signal conversion unit 131 receives the control signal CS, the output terminal I1 and I2 of the signal conversion unit 131 are connected to the input terminal of the signal processing unit 132, respectively, which is used for receiving control signal CS and making the control signal level conversion. This means that the wide range control signals will be changed into high and low level signals. This embodiment could be implemented by using the general conversion circuit.

The input terminal of the signal processing unit 132 is connected to the output terminal I1 and I2 of the signal conversion unit, the output terminal I4 of the phase sequence detection module 122, and the output terminal I3 of the phase lack detection module 121, respectively, and the output terminal O1 and O2 are connected to the input terminal of the driver module I4, respectively, which is used for processing the transmission signal of signal conversion unit 131 and the input signal of phase sequence detection module 122 and phase lack detection module 121, and then outputting the processed control results to driver module 14.

Phase lack alarm output unit 133 is connected to the signal processing unit 132, which is used for alarming when the three-phase power supply has lacking phase. During the concrete implementation, automatic phase correction and phase lack protection logic module 13 cannot contain the phase lack alarm output unit 133 either. This means that it is not the core unit module of the phase lack protection logic module 13, and thus the invention will not limit it here.

Figure 3:
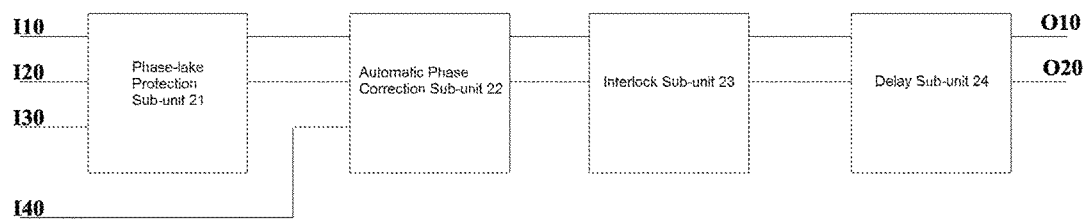
FIG. 3 shows a structure diagram for the signal processing unit.

As shown in FIG. 3, the signal processing unit 132 further includes:

Phase lack protection sub-unit 21, automatic phase correction sub-unit 22, interlock sub-unit 23, delay sub-unit 24, the first input terminal I10, the second input terminal I20, the third input terminal I30, the fourth input terminal I40, the first output terminal O10, and the second output terminal O20.

The first input terminal I10 and the second input terminal I20 are connected to the output terminal I1 and I2 of signal conversion unit 131, respectively.

The third input terminal I30 is connected to the output terminal I3 of phase lack detection module 121.

The fourth input terminal I40 is connected to the output terminal I4 of phase sequence detection module.

The first output terminal O10 and the second output terminal O20 are connected to the output terminal O1 and O2 of signal processing unit, respectively.

Among them, the first input terminal I10 to the third input terminal I30 are connected to the phase lack protection sub-unit 21, respectively, the fourth input terminal I40 is connected to the automatic phase correction sub-unit 2, and the first output terminal O10 and the second output terminal O20 are connected to the delay sub-unit 24.

In this embodiment, phase lack protection sub-unit 21, automatic phase correction sub-unit 22, interlock sub-unit 23, and delay sub-unit 24 are connected in turn. In specific implementation, the order of phase lack protection sub-unit 21 and automatic phase correction sub-unit 22 can be interchanged. This means that the automatic phase correction sub-unit 22, phase lack protection sub-unit 21, interlock sub-unit 23, and delay sub-unit 24 are connected in turn. The invention will not be limited here.

Wherein:

In phase lack protection sub-unit 21, when the three-phase power supply provides power to the power components module, and at least one phase power connection is disconnected, this sub-unit will directly lock the output results and make the control signal output to the driving module 14 invalid according to the phase lack signal output from the phase lack detection module.

In automatic phase correction sub unit 22, when the three-phase power supply provides power to the power components module, and any two phase interchanges connection positions, that will lead to change the input phase sequence of three-phase power, at this time, automatic phase correction sub-unit 22 will make the input control signal reverse, namely if the input control signal is high/low level, through the automatic phase correction sub-unit 22 outputs low/high level, and make the load phase sequence loaded to the three-phase power invariantly according to the output phase sequence signal of the phase sequence detection module 121.

In the interlock sub-unit 23, when the output signal of the prior unit to the interlock sub-unit 23 identical signals are the same, the unit will lock the output results, namely when the interlock sub-unit receives the 2 high/low level signal at the same time, the unit output results are all low level or high level.

In the delay sub-unit 24, the shutoff of SCR in the power components module 15 requires that the load current should be less than a certain value. It is easy to cause short circuit faults of the solid state relay internal inter-phase when providing the power components module with the driver signal this time, namely in case a group of power components are not completely cut-off, while another group of power components has turned-on, thereby leading to short circuit faults of inter-phase. The delay sub-unit 24 will delay the output control signal of the driver module 14 and make the control signal output to driver module 14 after the power components of the power components module 15 shut off.

Figure 4A:
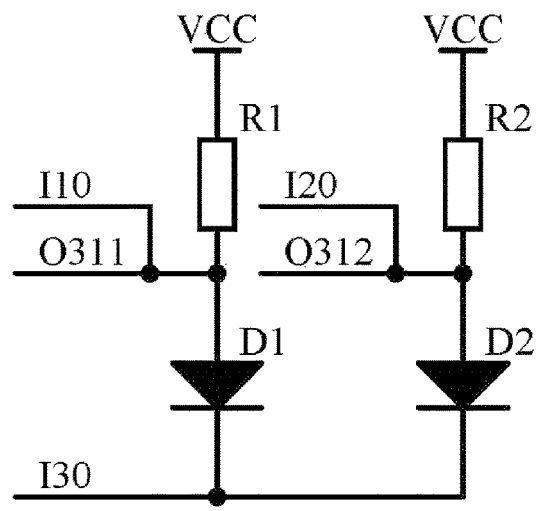
FIG. 4a shows an optimizing circuit schematic diagram for the phase lack protection sub-unit.

As shown in FIG. 4*a*, phase lack protection sub-unit 21 further includes:

The first resistance R1, the second resistance R2, the first diode D1, and the second diode D2.

The first resistance R1 is connected to the anode of the first diode D1, and the anode of the first diode D1 is connected to the first input terminal I10, the anode of the first diode D1 as the first output terminal O311 of the phase lack protection sub-unit 21.

The second resistance R2 is connected to the anode of the second diode D2, and the anode of the second diode D2 is connected to the second input terminal I20, the anode of the second diode D2 as the second output terminal O312 of the phase lack protection sub-unit 21.

The cathode of the first diode D1 is connected to the cathode of the second diode D2, and then connected to the third input terminal I30.

Figure 4B:
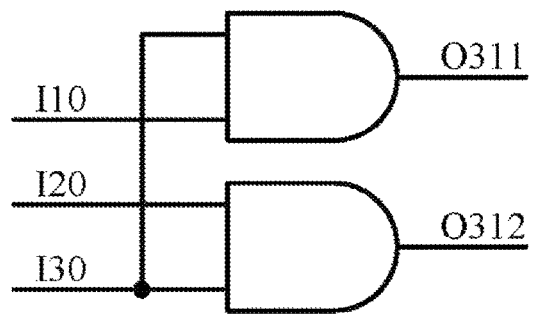
FIG. 4b shows a first alternative circuit schematic diagram for the phase lack protection sub-unit.
Figure 4C:
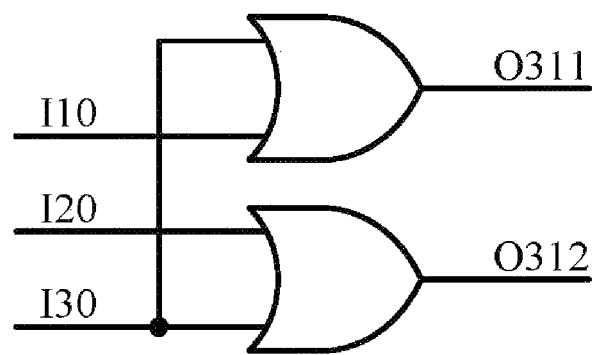
FIG. 4c shows a second alternative circuit schematic diagram for the phase lack protection sub-unit.

The circuit is only the phase lack protection sub-unit in the preferred embodiment. When the implementation is put into practice, it has many alternatives, as shown in FIG. 4*b* which is composed of two AND logic devices and FIG. 4C which is composed of two OR logic devices, the circuit is used for the phase lack protection sub-unit 21 outputting 2 same control signals when the lacking phase signal represents phase lacking with high level. The specific circuit is not restricted by the invention.

Figure 5A:
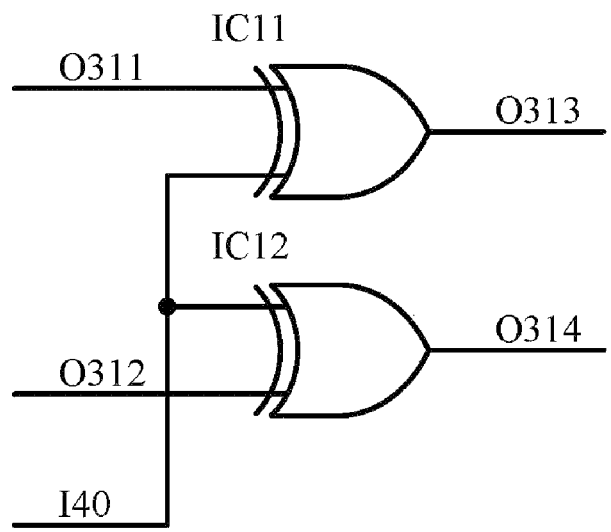
FIG. 5a shows an optimizing circuit schematic diagram for the automatic phase correction sub-unit.

As shown in FIG. 5a, the automatic phase correction sub-unit 22 further includes the first XOR (exclusive-OR) logic device IC11 and the second XOR (exclusive-OR) logic device IC12.

An arbitrary input terminal of the first XOR (exclusive-OR) logic device IC11 is connected to an arbitrary input terminal of the second XOR (exclusive-OR) logic device IC12, and the input terminal of the first XOR (exclusive-OR) logic device IC11 is connected to the fourth input terminal I40.

The other input terminal of the first XOR (exclusive-OR) logic device IC11 is connected to the first output terminal O311 of the phase lack protection sub-unit, and the output terminal of the first XOR (exclusive-OR) logic device IC11 is marked output terminal O313.

The other input terminal of the second XOR (exclusive-OR) logic device IC12 is connected to the second sub-output terminal O312, and the output terminal of the second XOR (exclusive-OR) logic device IC12 is marked output terminal O314.

Figure 5B:
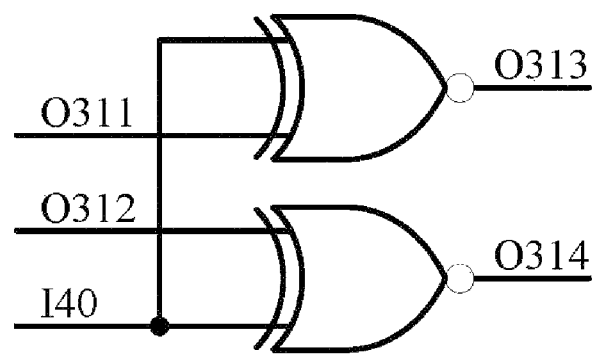
FIG. 5b shows a first alternative circuit schematic diagram for the automatic phase correction sub-unit.

The circuit is only the automatic phase correction sub-unit in the preferred embodiment. When the implementation is put into practice, it has many alternatives, as shown in FIG. 5b which is composed of two x-nor logic devices, when the sequence signal changes, the automatic phase correction unit 22 output signal will change together with it. The specific circuit is not restricted by the invention.

Figure 6A:
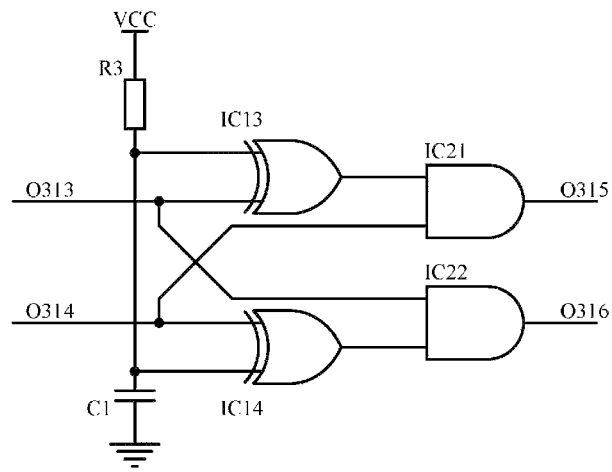
FIG. 6a shows an optimizing circuit schematic diagram for the interlock sub-unit.

As shown in FIG. 6a, the interlock sub-unit 23 further includes the third resistance R3, the first capacitance C1, the third XOR (exclusive-OR) logic device IC13, the fourth XOR (exclusive-OR) logic device IC14, the first AND logic device IC21 and the second AND logic device IC22.

One terminal of the third resistance R3 is connected to the working power supply, the other terminal is connected to an arbitrary input terminal of the third XOR (exclusive-OR) logic device IC13, an arbitrary input terminal of the fourth XOR (exclusive-OR) logic device IC14, and an arbitrary terminal of the first capacitance C1, respectively. The other terminal of the first capacitance C1 is connected to the working ground.

The other input terminal of the third XOR (exclusive-OR) logic device IC13 is connected to the output terminal O313 of the first XOR (exclusive-OR) logic device and an arbitrary input terminal of the second AND logic device IC22, respectively.

The output terminal of the third OXR (exclusive-OR) logic device IC13 is connected to an arbitrary input terminal of the first AND logic device IC21.

The other input terminal of the fourth OXR (exclusive-OR) logic device IC14 is connected to the output terminal O314 of the second XOR (exclusive-OR) logic device and the other input terminal of the first AND logic device IC21, respectively.

The output terminal of the fourth OXR (exclusive-OR) logic device IC14 is connected to the other input terminal of the second AND logic device IC22.

The output terminal of the first AND logic device IC21 is marked output terminal O315.

The output terminal of the second AND logic device IC22 is marked output terminal O316.

Figure 6B:
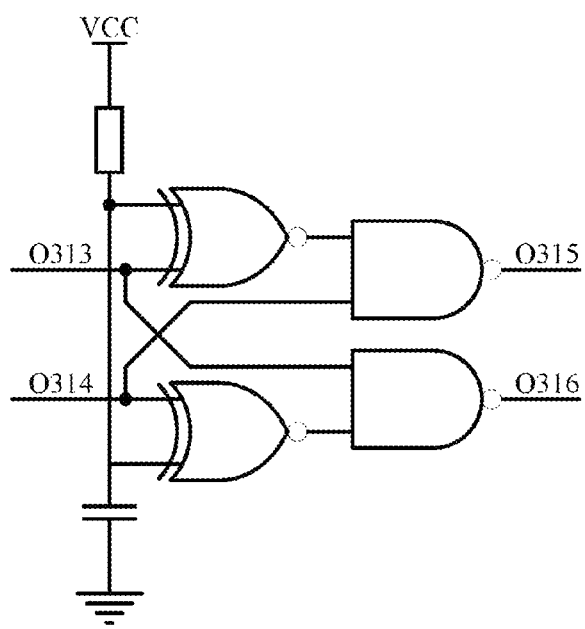
FIG. 6b shows a first alternative circuit schematic diagram for the interlock sub-unit.
Figure 6C:
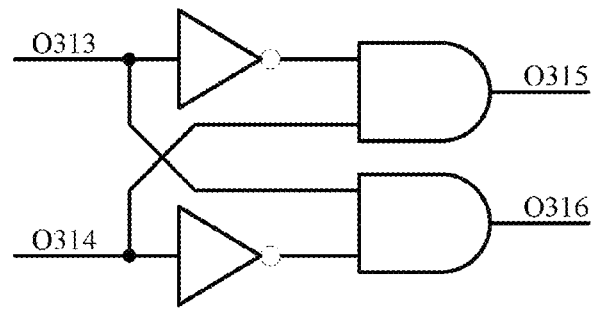
FIG. 6c shows a second alternative circuit schematic diagram for the interlock sub-unit.

The circuit is only the interlock sub-unit in the preferred embodiment. When the implementation is put into practice, it has many alternatives, as shown in FIG. 6b which is composed of two same-or logic devices, two NAND logic devices, a resistor, and a capacitor component. FIG. 6c consists of two reverse logic devices and two AND logic devices. When the input signals are identical, the signal transferred in the reverse logic device is reversed. At this time, the input signals to the AND logic device are 2 different signals, and the output is low level. When two different signals are input to the interlock sub-unit, the signal transferred in the reverse logic device is reversed, the input to one of the AND logic devices is high level, the input to the other AND logic device is low level, and, at this time, the output signals through two AND logic devices are a high level and a low level, so as to guarantee the control signal from the interlock sub-unit output to the drive module is not valid at the same time. The specific circuit is not restricted by the invention.

Figure 7:
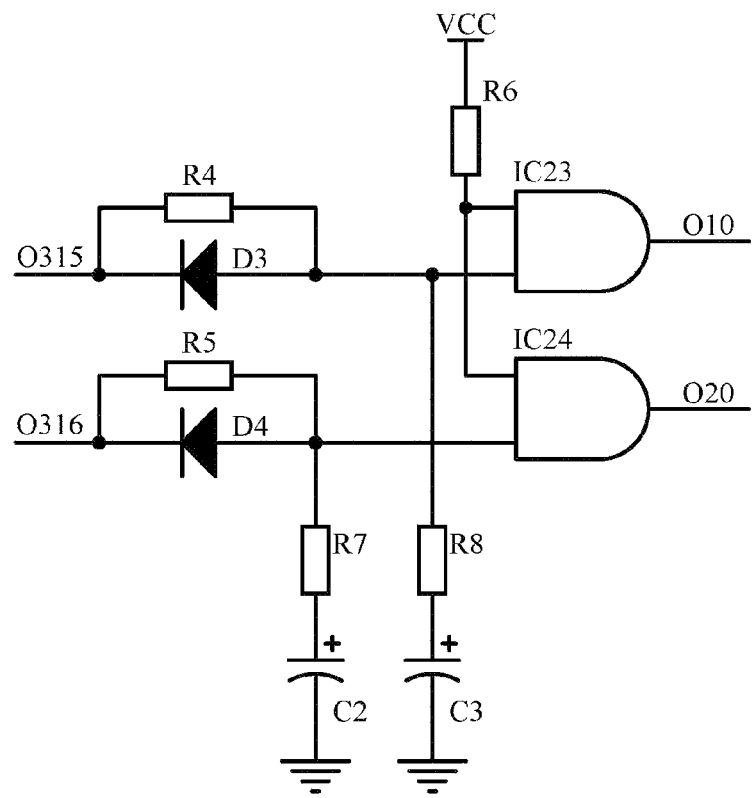
FIG. 7 shows an optimizing circuit schematic diagram for the delay sub-unit.

As shown in FIG. 7, the delay sub-unit 23 further includes:

The fourth resistance R4, the fifth resistance R5, the sixth resistance R6, the seventh resistance R7, the eighth resistance R8, the second capacitance C2, the third capacitance C3, the third diode D3, the fourth diode D4, the third AND logic device IC23, and the fourth AND logic device IC24.

The third diode D3 and the fourth resistance R4 are in parallel, the cathode of the third diode D3 is connected to the output terminal O315 of the first AND logic device, and the anode of the third diode D3 is connected to an arbitrary terminal of the eighth resistance R8 and an arbitrary input terminal of the third AND logic device IC23, respectively.

The fourth diode D4 and the fifth resistance R5 are in parallel, the cathode of the fourth diode D4 is connected to the output terminal O316 of the second AND logic device, and the anode of the fourth diode D4 is connected to an arbitrary terminal of the seventh resistance R7 and an arbitrary input terminal of the fourth AND logic device IC24, respectively.

An arbitrary terminal of the seventh resistance R7 is connected to the anode of the second capacitance C2, and the cathode of the second capacitance C2 is connected to the working ground.

An arbitrary terminal of the eighth resistance R8 is connected to the anode of the third capacitance C3, and the cathode of the third capacitance C3 is connected to the working ground.

An arbitrary terminal of the sixth resistance R6 is connected to the other input terminal of the third AND logic device IC23 and the other input terminal of the fourth AND logic device IC24, respectively, and the other terminal of the sixth resistance R6 is connected to the working power supply.

The output terminal of the third AND logic device IC23 is connected to the first output terminal O10.

The output terminal of the fourth AND logic device IC24 is connected to the second output terminal O20.

Figure 8A:
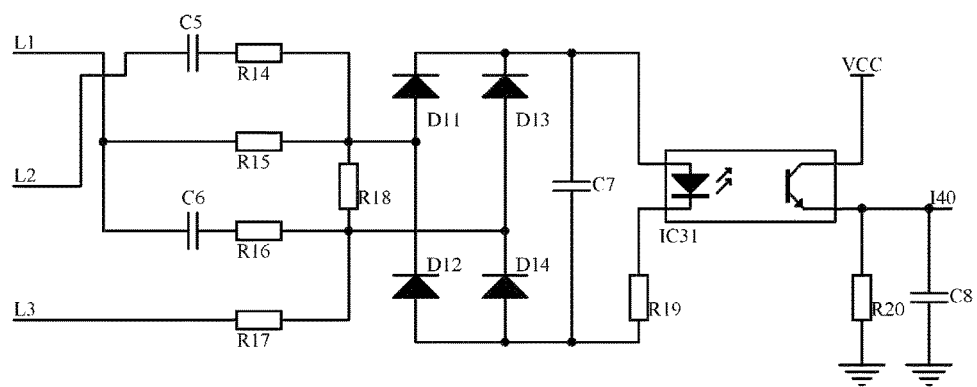
FIG. 8a shows an optimizing circuit schematic diagram for the phase sequence detection module.

As shown in FIG. 8, the phase sequence detection module 122 further includes:

The fourteenth resistance R14, the fifteenth resistance R15, the sixteenth resistance R16, the seventeenth resistance R17, the eighteenth resistance R18, the nineteenth resistance R19, the twentieth resistance R20, the fifth capacitance C5, the sixth capacitance C6, the seventh capacitance C7, the eighth capacitance C8, the eleventh diode D11, the twelfth diode D12, the thirteenth diode D13, the fourteenth diode D14, and the first photoelectric coupler IC31.

The first phase L1 of the three-phase power supply is connected to an arbitrary terminal of the fifteenth resistance R15 and an arbitrary terminal of the sixth capacitance C6, respectively.

The other terminal of the fifteenth resistance R15 is connected to an arbitrary terminal of the fourteenth resistance R14, an arbitrary terminal of the eighteenth resistance R18, the anode of the eleventh diode D11, and the cathode of the twelfth diode D12, respectively.

The other terminal of the sixth capacitance C6 is connected to an arbitrary terminal of the sixteenth resistance R16.

The other terminal of the sixteenth resistance R16 is connected to the other terminal of the eighteenth resistance R18, an arbitrary terminal of the seventeenth resistance R17, the anode of the thirteenth diode D13, and the cathode of the fourteenth diode D14, respectively.

The second phase L2 of the three-phase power supply is connected to an arbitrary terminal of the fifth capacitance C5.

The other terminal of the fifth capacitance C5 is connected to the other terminal of the fourteenth resistance R14.

The third phase L3 of the three-phase power supply is connected to the other terminal of the seventeenth resistance R17.

The input terminal of the first photoelectric coupler IC31, that is the anode of the light-emitting diode (LED), is connected to the cathode of the eleventh diode D11, the cathode of the thirteenth diode D13, and an arbitrary terminal of the seventh capacitance C7, respectively, and the cathode of LED is connected to an arbitrary terminal of the nineteenth resistance R19.

The other terminal of the nineteenth resistance R19 is connected to the other terminal of the seventh capacitance C7, the anode of the twelfth diode D12, and the cathode of the fourteenth diode D14, respectively.

The output terminal of the first photoelectric coupler IC31, that is the collector electrode of the triode, is connected to the working power supply, and the emitter of the triode is connected to an arbitrary terminal of the twelfth resistance R20, an arbitrary terminal of the eighth capacitance C8, and the fourth input terminal, respectively.

The other terminal of the twelfth resistance R20 and the other terminal of the eighth capacitance C8 are connected to the working ground, respectively.

Figure 8B:
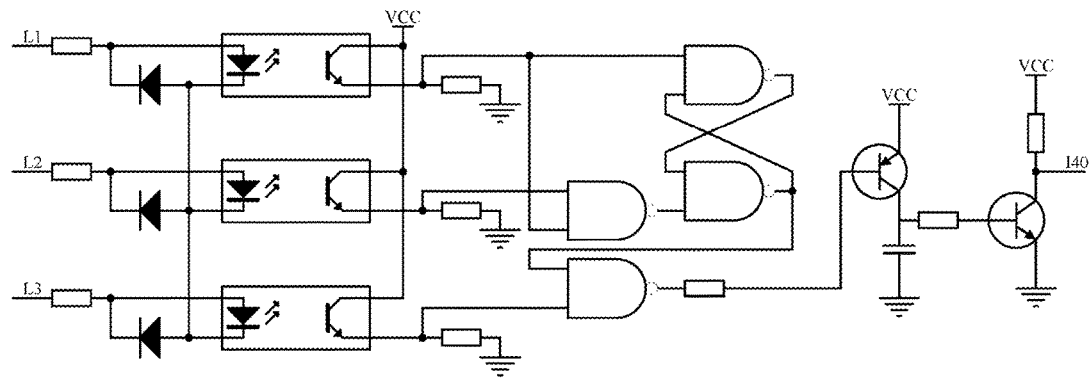
FIG. 8b shows a first alternative circuit schematic diagram for the phase sequence detection module.
Figure 8C:
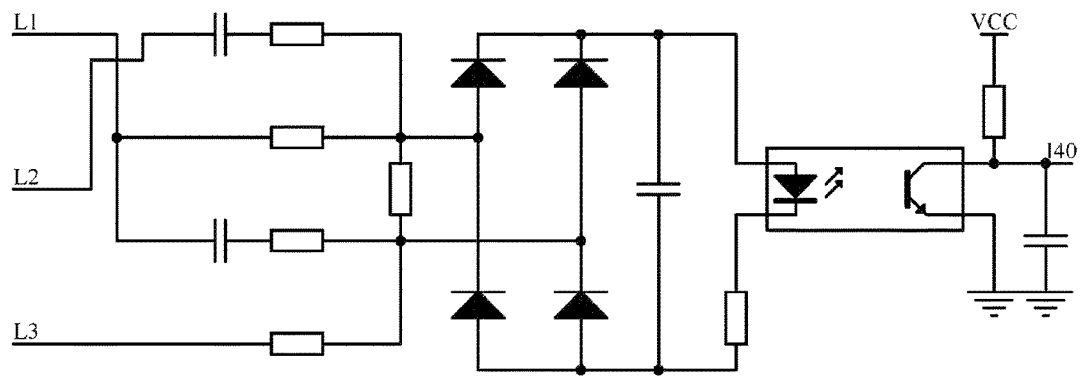
FIG. 8c shows a second alternative circuit schematic diagram for the phase sequence detection module.

The circuit is only the phase sequence detection module in the preferred embodiment. When the implementation is put into practice, it has many alternatives, as shown in FIG. 8b which consists of nine resistors, three diodes, three photoelectric couplers, four NAND logic devices, two transistors, and a capacitor component. A three-phase rectifier bridge is composed of the input terminals of three photoelectric couplers and the three diodes, with the three resistors to limit the current in the rectifier bridge. At this time, three photoelectric couplers will output six group signals, the six group signals transferred in four NAND logic devices and the NAND logic devices output the duty ratio signal that has the same periodic with the three-phase power, or a high level signal with 100% duty cycle, the high level signal makes the PNP triode cut off, and finally the circuit outputs the high level signal as the phase state at present; or a high level signal with ⅚ duty cycle, the signal makes the PNP transistor be conducted in ⅙ cycle to charge the back of the capacitance, and makes the NPN transistor be conducted, in another ⅚ cycle the PNP transistor is keeping conducting by capacitor discharge, finally it outputs a low level as the phase state at present. The circuit in FIG. 8c is on the basis of that in FIG. 8a, changing the output terminal circuit of the optoelectronic devices, outputting the reverse phase sequence signal with that in FIG. 8a to represent different phase state. The specific circuit is not restricted by the invention.

Figure 9A:
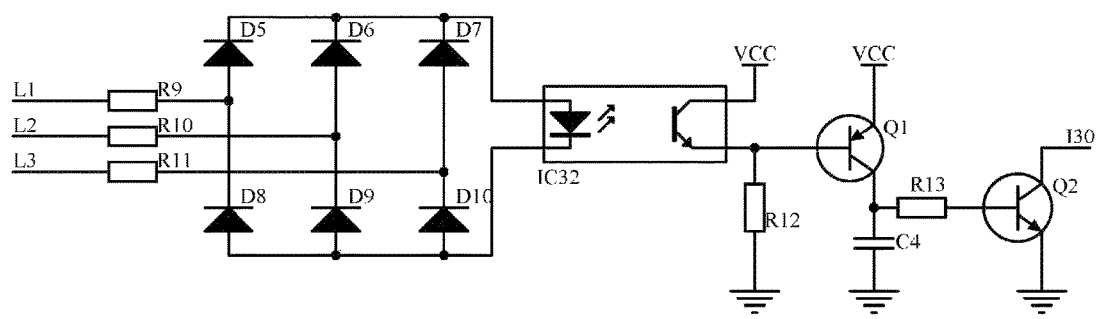
FIG. 9a shows an optimizing circuit schematic diagram for the phase lack detection module.

As shown in FIG. 9a, the phase lack detection module 121 further includes:

The ninth resistance R9, the tenth resistance R10, the eleventh resistance R11, the twelfth resistance R12, the thirteenth resistance R13, the fourth capacitance C4, the fifth diode D5, the sixth diode D6, the seventh diode D7, the eighth diode D8, the ninth diode D9, the tenth diode D10, the second photoelectric coupler IC32, the first triode Q1, and the second triode Q2.

The first phase L1 of the three-phase power supply is connected to an arbitrary terminal of the ninth resistance R9, and the other terminal of the ninth resistance R9 is connected to the anode of the fifth diode D5 and the cathode of the eighth diode D8, respectively.

The second phase L2 of the three-phase power supply is connected to an arbitrary terminal of the tenth resistance R10, and the other terminal of the tenth resistance R10 is connected to the anode of the sixth diode D6 and the cathode of the ninth diode D9, respectively.

The third phase L3 of the three-phase power supply is connected to an arbitrary terminal of the eleventh resistance R11, and the other terminal of the eleventh resistance R11 is connected to the anode of the seventh diode D7 and the cathode of the tenth diode D10, respectively.

The input terminal of the second photoelectric coupler IC32, that is the anode of LED, is connected to the cathode of the fifth diode D5, the cathode of the sixth diode D6, and the cathode of the seventh diode D7, respectively, and the cathode of the LED is connected to the anode of the eighth diode D8, the anode of the ninth diode D9, and the anode of the tenth anode D10, respectively.

The output terminal of the second photoelectric coupler IC32, that is the collector of the triode, is connected to the working power supply, and the emitter of the triode is connected to an arbitrary terminal of the twelfth resistance R12 and the base electrode of the first triode Q1. The other terminal of the twelfth resistance R12 is connected to the working ground.

The collector of the first triode Q1 is connected to the working power supply, and the emitter is connected to an arbitrary terminal of the fourth capacitance C4 and an arbitrary terminal of the thirteenth resistance R13. The other terminal of the fourth capacitance C4 is connected to the working ground.

The base of the second triode Q2 is connected to the other terminal of the thirteenth resistance R13, the collector is connected to the third input terminal I30, and the emitter is connected to the working ground.

Figure 9B:
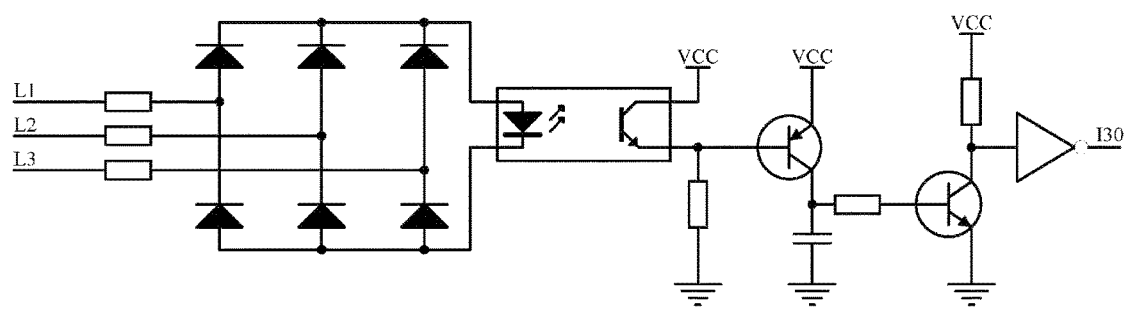
FIG. 9b shows a first alternative circuit schematic diagram for the phase lack detection module.

The circuit is only phase lack detection module in the preferred embodiment. When the implementation is put into practice, it has many alternatives, as shown in FIG. 9b the schematic diagram of phase lack detection circuit is based on that in FIG. 9a. A reverse logic device is added at the phase lack signal output terminal, and a lacking phase signals opposite to that in FIG. 9a is used to represent the phase state at present. The specific circuit is not restricted by the invention.

As shown in FIG. 10, combining with the solid state relay as mentioned above, the control method for three-phase AC motor running direction with the solid state relay are further described, which includes the following steps:

S1: The three-phase power supply is connected to the phase sequence detection module 122, which can detect the power phase sequence of three-phase power supply and provides the phase sequence signal to signal processing unit 132 of the automatic phase correction and phase lack protection logic module 13.

S2: The three-phase power supply is connected to the phase lack detection module 121 which can detect whether there is a lack of phase in the three-phase power supply and provides the phase lack signal to signal processing unit of the automatic phase correction and phase lack protection logic module 13.

S3: The control signal CS is input to signal conversion unit 131, and signal conversion unit 131 processes the control signal CS and then outputs it to the signal processing unit 132.

S4: The signal processing unit 132 processes the transmission signal of signal conversion unit 131 and the input signal of phase sequence detection module 122 and phase lack detection module 121, then outputs the processed control result to the driver module 14.

S5: The drive module 14 controls the phase sequence of the three-phase motor by controlling the power components module 15.

As shown in FIG. 10, steps S1 to S5 are sequentially connected, but during the concrete implementing, the above steps S1, S2, S3 have no sequence. The three steps can either be carried out at the same time, or be carried out in different sequence. The invention does not restrict the sequence of steps S1, S2, S3.

Step S1 further includes:
Set high/low level as the positive phase sequence of three-phase power supply, and low/high level as the reverse phase sequence of three-phase power supply. At this time, the phase sequence detection module 122 would output a corresponding high/low level signal to the signal processing unit 132 according to the current input three-phase power supply phase sequence state.

Step S2 further includes:
Set high/low level as three-phase power supply with phase lacking, and low/high level as three-phase power supply without phase lacking. The phase lack detection module 122 would output a corresponding high/low level signal to the signal processing unit 132 according to the current input three-phase power supply phase state.

Step S4 further includes:
S41: The control signal of the signal conversion unit 131 and the phase lack signal of the phase lack detection module are output to the phase lack protection sub-unit 21. When the three-phase power supply provides power to power components module 15 and it appears that at least one phase power connection is broken, the phase lack protection sub-unit will directly lock the output result. This makes the control signal output to driver module 14 invalid, according to the phase lack signal of the phase lack detection module 121.

S42: The output signal of the phase lack protection sub-unit 21 and the phase sequence signal of the phase sequence detection module are output to the automatic phase correction sub-unit 22. When the three-phase power supply provides power to power components module 15 and the connections of any two phases of the three-phase power are interchanged, the input sequence of the three-phase power supply would be changed. At this time, the automatic phase correction sub-unit 22 makes the input control signal output reversely, namely, the input control signal is the high/low level, the output signal through the automatic phase correction sub-unit is low/high level, and finally the phase sequence of three-phase power supply with load is unchanged according to the phase sequence signal of the phase sequence detection unit 122.

S43: The automatic phase correction sub-unit 22 outputs signals to the interlock sub-unit 23. The interlock sub-unit will output a pair of (two) low level when the interlock sub-unit 23 receives a pair of (two) same signals.

S44: The output signal of the interlock sub-unit 23 is transmitted to the delay sub-unit 24. The SCR in power components module 15 will be turned-off, that require the SCR load current be less than a certain value. To provide power component drive signal at this time will lead to internal inter-phase short circuit of the solid state relay easily. The delay sub-unit 24 will delay the output control signal of the driver module to the power components of the power components module shut off and then make the control signal output to driver circuit.

In the above step, in step 2, the order of phase lack protection sub-unit 21 and automatic phase correction sub-unit 22 can be interchanged. The invention does not limit the order of the above-mentioned steps.

Compared with the existing technology, the beneficial effect of the invention is as follows:

First, the solid state relay of the invention with the structure function concentration can realize the automatic phase correction and phase lack protection without connecting external equipments.

Second, the solid state relay realizes the structure of automatic phase correction and phase lack protection completely by discrete components, namely hardware circuits. Eliminating the MCU/DSP controller which may be used for external equipments and saving the cost thereof will realize the same function with low price.

Thirdly, two input control signals of the positive rotation and reverse rotation in the solid state relay are interlocking and delay for a period of time and then are provided to the control logic. This solves the problem of interphase short circuit fault due to the SCR shutoff characteristics.

Fourth, solid state relay works in high voltage conditions, requiring the working device to have a strong anti-interference ability. The structure of the solid state relay in the invention is composed of discrete components, namely, it is implemented by the hardware circuit and therefore has strong anti-interference ability.

Fifth, the structure of the solid state relay in the invention is composed of discrete components, namely, it is implemented by the hardware circuit. This is better when compared with the MCU/DSP implementation circuit, because there is no crash phenomenon and software operation error caused by damage to the device or accident. Also, the realization of the invention has the advantages of simple circuit and reliable safety.

Sixth, the invention allows the three-phase AC motor in the three-phase power to be monitored in real-time so that, when the lack of phase occurs, the input signal path is cut-off, the power module is shut off, and motor burnout due to open-phase operation can be avoided.

Seventh, the invention can provide real-time monitoring of the input phase sequence of three-phase power so that, when the input phase sequence of the three-phase power changes, the internal control logic will be issued corresponding control instructions and make the motor phase constant. This avoids the motor running direction and the expected direction to be in non-conformance due to the phase sequence changes.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:
1. A motor control module for the control of three-phase AC motor running direction, comprising:

a driver module; and a power components module, connected to the driver module;

a three-phase power supply connected to the power components module;

a three-load connected to the power components module;

a phase sequence detection module connected to the phase lack detection module;

an automatic phase correction module; and a phase lack protection logic module, wherein an input terminal of the phase sequence detection module is connected to the three-phase power supply, an output terminal of the phase sequence detection is connected to the automatic phase correction module and the phase lack protection logic module, which is used for detecting phase sequence of the three-phase power supply, and providing phase sequence signal to automatic phase correction and phase lack protection logic module, wherein an input terminal of the phase lack detection module is connected to the three-phase power supply, an output terminal of the phase lack detection module is connected to the automatic phase correction module and phase lack protection logic module, which is used for detecting three-phase power supply in the presence of phase lacking and providing the missing phase signal to automatic phase correction and phase lack protection logic module, wherein the automatic phase correction module and phase lack protection logic module further comprise:

a signal conversion unit, which receives a control signal and performs level conversion;

a signal processing unit, which is connected to the signal conversion unit, and then connected to the output terminal of the phase sequence detection module, the output terminal of the phase lack detection module output terminal and the driver module, respectively, which is used for processing the control signal and then outputting the processed control results to the driver module, wherein the signal processing unit makes the input control signal by an opposite output when a three-phase electricity phase sequence is changed and makes the output invalid when a missing phase signal indicates a three-phase electricity contains a lack of phase.

2. The motor control module of claim 1, wherein the signal processing unit further comprises:

a phase lack protection sub-unit;

an automatic phase correction sub-unit;

an interlock sub-unit;

a delay sub-unit;

a first input terminal, terminal;

a second input terminal, terminal;

a third input terminal, terminal;

a fourth input terminal, terminal;

a first output terminal, terminal; and a second output terminal, wherein the first input terminal and the second input terminal are connected to the output terminal of the signal conversion unit, wherein the third input terminal is connected to the output terminal of the phase lack detection module, wherein the fourth input terminal is connected to the output terminal of the phase sequence detection module, wherein the first output terminal and the second output terminal are connected to the output terminal of the signal processing unit output terminal, wherein the first input terminal, the second input terminal and the third input terminal are connected to the phase lack protection sub-unit, the fourth input terminal is connected to the automatic phase correction sub-unit, and the first output terminal and the second output terminal are connected to the delay sub-unit, wherein the phase lack protection sub-unit, the automatic phase correction sub-unit, the interlock sub-unit, and the delay sub-unit are connected or the automatic phase correction sub-unit, the phase protection sub-unit, the interlock sub-unit, and the delay sub-unit are connected, wherein the phase lack protection sub-unit is used according to the phase detection module output phase signal, an output of the phase lock protection sub-unit is locked directly and results invalid when the three-phase electricity has a lack of phase, wherein the automatic phase correction sub-unit is used according to the phase sequence detection module output phase sequence signal, wherein interlock sub-unit is used for a unit for a current output to the interlock sub-unit identical signals, the output of the interlock sub-unit is locked and the result invalid, and wherein the delay sub-unit delays an output control signal of the driver module and outputs the control signal to the driver module after the power components of the power components module shut off.

3. The motor control module of claim 2, wherein the phase lack protection sub-unit further comprises:

a first resistance;

a second resistance a first diode; and a second diode, wherein the first resistance is connected to an anode of the first diode, the anode of the first diode is connected to the first input terminal, and the anode of the first diode serves as the first output terminal of the phase lack protection sub-unit, wherein the second resistance is connected to an anode of the second diode, the anode of the second diode is connected to the second input terminal, and the anode of the second diode serves as the second output terminal of the phase lack protection sub-unit, and wherein a cathode of the first diode is connected to a cathode of the second diode, and is then connected to the third input terminal.

4. The motor control module of claim 2, wherein the automatic phase correction sub-unit further comprising:

a first XOR (exclusive-OR) logic device; and a second XOR (exclusive-OR) logic device, wherein an arbitrary input terminal of the first XOR (exclusive-OR) logic device is connected to an arbitrary input terminal of the second XOR (exclusive-OR) logic device, and the arbitrary input terminal of the first XOR (exclusive-OR) logic device is connected to the fourth input terminal, wherein an other input terminal of the first XOR (exclusive-OR) logic device is connected to the first output terminal of the phase lack protection sub-unit, and wherein an other input terminal of the second XOR (exclusive-OR) logic device is connected to the second output terminal of the phase lack protection sub-unit.

5. The motor control module of claim 4, wherein the interlock sub-unit further comprises:
a third resistance;
a first capacitance;
a third XOR (exclusive-OR) logic device;
a fourth XOR (exclusive-OR) logic device;
a first AND logic device; and
a second AND logic device,
wherein one terminal of the third resistance is connected to a working power supply, an other terminal is connected to an arbitrary input terminal of the third XOR (exclusive-OR) logic device, an arbitrary input terminal of the fourth XOR (exclusive-OR) logic device and an arbitrary terminal of the first capacitance,
wherein an other terminal of the first capacitance is connected to a working ground,
wherein an other input terminal of the third XOR (exclusive-OR) logic device is connected to the output terminal of the first XOR (exclusive-OR) logic device and an arbitrary input terminal of the second AND logic device,
wherein the output terminal of the third OXR (exclusive-OR) logic device is connected to an arbitrary input terminal of the first AND logic device,
wherein the other input terminal of the fourth OXR (exclusive-OR) logic device is connected to the output terminal of the second OXR (exclusive-OR) logic device and the other input terminal of the first AND logic device, and
wherein the output terminal of the fourth OXR (exclusive-OR) logic device is connected to the other input terminal of the second AND logic device.

6. The motor control module of claim 5, wherein the delay sub-unit further comprises:
a fourth resistance;
a fifth resistance;
a sixth resistance;
a seventh resistance;
an eighth resistance;
a second capacitance;
a third capacitance;
a third diode;
a fourth diode;
a third AND logic device; and
a fourth AND logic device,
wherein the third diode and the fourth resistance are in parallel, a cathode of the third diode is connected to the output terminal of the first AND logic device, and an anode of the third diode is connected to an arbitrary terminal of the eighth resistance and an arbitrary input terminal of the third AND logic device,
wherein, the fourth diode and the fifth resistance are in parallel, a cathode of the fourth diode is connected to the output terminal of the second AND logic device, and an anode of the fourth diode is connected to an arbitrary terminal of the seventh resistance and an arbitrary input terminal of the fourth AND logic device,
wherein an other terminal of the seventh resistance is connected to an anode of the second capacitance, a cathode of the second capacitance is connected to the working ground,
wherein an arbitrary terminal of the eighth resistance is connected to an anode of the third capacitance, and a cathode of the third capacitance is connected to the working ground,
wherein an arbitrary terminal of the sixth resistance is connected to the other input terminal of the third AND logic device and the other input terminal of the fourth AND logic device, the other terminal of the sixth resistance is connected to the working power supply,
wherein an output terminal of the third AND logic device is connected to the first output terminal, and
wherein an output terminal of the fourth AND logic device is connected to the second output terminal.

7. The motor control module of claim 6, wherein the phase sequence detection module further comprises:
a fourteenth resistance;
a fifteenth resistance;
a sixteenth resistance;
a seventeenth resistance;
a eighteenth resistance;
a nineteenth resistance;
a twentieth resistance;
a fifth capacitance;
a sixth capacitance;
a seventh capacitance;
an eighth capacitance;
an eleventh diode;
a twelfth diode;
a thirteenth diode;
a fourteenth diode; and
a first photoelectric coupler,
wherein a first phase of the three-phase power supply is connected to an arbitrary terminal of the fifteenth resistance and an arbitrary terminal of the sixth capacitance,
wherein an other terminal of the fifteenth resistance is connected to an arbitrary terminal of the fourteenth resistance, an arbitrary terminal of the eighteenth resistance, an anode of the eleventh diode and a cathode of the twelfth diode,
wherein an other terminal of the sixth capacitance is connected to an arbitrary terminal of the sixteenth resistance,
wherein an other terminal of the sixteenth resistance is connected to the other terminal of the eighteenth resistance, an arbitrary terminal of the seventeenth resistance, an anode of the thirteenth diode and a cathode of the fourteenth diode,
wherein a second phase of the three-phase power supply is connected to an arbitrary terminal of the fifth capacitance,
wherein an other terminal of the fifth capacitance is connected to the other terminal of the fourteenth resistance,
wherein a third phase of the three-phase power supply is connected to the other terminal of the seventeenth resistance,
wherein an input terminal of the first photoelectric coupler and an anode of a light-emitting diode (LED) are connected to a cathode of the eleventh diode, a cathode of the thirteenth diode and an arbitrary terminal of the seventh capacitance,
wherein a cathode of the LED is connected to an arbitrary terminal of the nineteenth resistance,
wherein an other terminal of the nineteenth resistance is connected to the other terminal of the seventh capacitance, an anode of the twelfth diode and a cathode of the fourteenth diode,
wherein an output terminal of the first photoelectric coupler and a collector electrode of a triode are connected to the working power supply, an emitter of the triode is connected to an arbitrary terminal of the twelfth resistance, an arbitrary terminal of the eighth capacitance and the fourth input terminal, and wherein an other terminal of the twelfth resistance and the other terminal of the eighth capacitance are connected to the working ground.

8. The motor control module of claim 7, wherein the phase lack detection module further comprises:
   a ninth resistance;
   a tenth resistance;
   an eleventh resistance;
   a twelfth resistance;
   a thirteenth resistance;
   a fourth capacitance;
   a fifth diode;
   a sixth diode;
   a seventh diode;
   an eighth diode;
   a ninth diode;
   a tenth diode;
   a second photoelectric coupler;
   the first triode; and
   a second triode,
   wherein the first phase of the three-phase power supply is connected to an arbitrary terminal of the ninth resistance, an other terminal of the ninth resistance is connected to an anode of the fifth diode and a cathode of the eighth diode,
   wherein the second phase of the three-phase power supply is connected to an arbitrary terminal of the tenth resistance, an other terminal of the tenth resistance is connected to an anode of the sixth diode and a cathode of the ninth diode,
   wherein the third phase of the three-phase power supply is connected to an arbitrary terminal of the eleventh resistance, an other terminal of the eleventh resistance is connected to an anode of the seventh diode and a cathode of the tenth diode,
   wherein an input terminal of the second photoelectric coupler and the anode of LED are connected to a cathode of the fifth diode, a cathode of the sixth diode and a cathode of the seventh diode,
   wherein the cathode of the LED is connected to an anode of the eighth diode, an anode of the ninth diode and an anode of the tenth anode,
   wherein an output of the second photoelectric coupler and a collector of the second triode are connected to the working power supply, an emitter of the second triode is connected to an arbitrary terminal of the twelfth resistance and a base electrode of the first triode,
   wherein an other terminal of the twelfth resistance is connected to the working ground,
   wherein the collector of the first triode is connected to the working power supply, the emitter of the first triode is connected to an arbitrary terminal of the fourth capacitance and an arbitrary terminal of the thirteenth resistance,
   wherein an other terminal of the fourth capacitance is connected to the working ground, and
   wherein a base of the second triode is connected to the other terminal of the thirteenth resistance, the collector of the second triode is connected to the third input terminal and the emitter of the second triode is connected to the working ground.

9. A method for controlling three-phase AC motor running direction using a motor control module according to claim 1, including the following steps:
   S1: the three-phase power supply is connected to the phase sequence detection module which can detect the power phase sequence of the three-phase power supply and provides the phase sequence signal to signal processing unit of the automatic phase correction and phase lack protection logic module;
   S2: the three-phase power supply is connected to the phase lack detection module which can detect whether there is a lack of phase in the three-phase power supply and provides the phase lack signal to signal processing unit of the automatic phase correction and phase lack protection logic module;
   S3: the control signal CS is input to signal conversion unit which processes the control signal CS and then output it to the signal processing unit;
   S4: the signal processing unit processes the transmission signal of signal conversion unit and the input signal of phase sequence detection module and phase lack detection module, then outputs the processed control result to the driver module; and
   S5: the drive module controls the phase sequence of the three-phase motor by controlling the power components module.

10. The method according to claim 9, wherein step 4 further comprises the following steps:
   S41: the control signal after the level conversion of the signal conversion unit and the lacking phase signal of the phase lack detection module are output to the phase lack protection sub-unit, when the three-phase power supply has phase lacking, the phase lack protection sub-unit will lock the output result, that is making the control signal output invalid, according to the phase lack signal of the phase lack detection module;
   S42: the output signal of the phase lack protection sub-unit and the phase sequence signal of the phase sequence detection module are output to the automatic phase correction sub-unit, when the phase sequence of the three-phase power changes, the automatic phase correction sub-unit make the control signal output reverse and the phase sequence of three-phase power supply with load unchanged according to the phase sequence signal of the phase sequence detection unit;
   S43: the output signal of the automatic phase correction sub-unit input to the interlock sub-unit, when the automatic phase correction sub-unit is output to the interlock sub-unit signals are identical, the interlock sub-unit will lock the output result and makes the control signal output invalid; and
   S44: the output signal of the interlock sub-unit is transmitted to the delay sub-unit, the delay sub-unit will delay the output control signal of the driver module and makes the control signal output to driver module after the power components of the power components module shut off.

* * * * *